(12) United States Patent
Pendleton

(10) Patent No.: US 7,797,917 B1
(45) Date of Patent: Sep. 21, 2010

(54) BI-DIRECTIONAL MULTI-BLADE MOWER HOUSING APPARATUS

(76) Inventor: Mark Jay Pendleton, 6494 Valley Hills Dr., Poland, IN (US) 47868

( * ) Notice: Subject to any disclaimer, the term of this patent is extended or adjusted under 35 U.S.C. 154(b) by 72 days.

(21) Appl. No.: 12/397,167

(22) Filed: Mar. 3, 2009

(51) Int. Cl.
*A01D 67/00* (2006.01)

(52) U.S. Cl. .................................................... 56/320.2

(58) Field of Classification Search ............... 56/320.2, 56/202, 17.4, 17.5, 255, 295, 320.1, DIG. 9, 56/DIG. 18, DIG. 24
See application file for complete search history.

(56) References Cited

U.S. PATENT DOCUMENTS

| | | | | |
|---|---|---|---|---|
| 3,339,353 | A | * | 9/1967 | Schreyer ............................ 56/6 |
| 3,901,003 | A | * | 8/1975 | Erdman ......................... 56/12.6 |
| 4,304,086 | A | * | 12/1981 | Stuchl .............................. 56/6 |
| 4,378,668 | A | * | 4/1983 | Gullett ......................... 56/12.7 |
| 4,395,865 | A | | 8/1983 | Davis, Jr. et al. |
| 4,445,312 | A | * | 5/1984 | Cartner ........................ 56/15.5 |
| 4,858,417 | A | * | 8/1989 | Priefert et al. ................... 56/6 |
| 5,040,364 | A | * | 8/1991 | Deegan ........................ 56/320.2 |
| 5,133,175 | A | * | 7/1992 | Dumbrell ..................... 56/17.4 |
| 5,481,857 | A | * | 1/1996 | Umemoto et al. ............. 56/12.6 |
| 5,581,987 | A | * | 12/1996 | Schuyler ........................ 56/255 |
| 5,813,202 | A | * | 9/1998 | Goman et al. ................. 56/15.2 |
| 5,867,973 | A | * | 2/1999 | Geier ............................ 56/295 |
| 6,425,231 | B1 | | 7/2002 | Yilmaz |
| 6,874,309 | B1 | * | 4/2005 | Bellis, Jr. ..................... 56/320.2 |
| 6,889,489 | B2 | | 5/2005 | Fackrell et al. |
| 7,185,479 | B1 | * | 3/2007 | Cartner ....................... 56/320.1 |
| 7,313,902 | B1 | * | 1/2008 | Eavenson et al. ............. 56/13.6 |
| 7,325,387 | B2 | * | 2/2008 | Samejima et al. ............ 56/16.2 |
| 7,448,195 | B2 | * | 11/2008 | Kohler ....................... 56/320.2 |
| 2004/0128970 | A1 | * | 7/2004 | Gazlay ....................... 56/320.2 |
| 2004/0237492 | A1 | * | 12/2004 | Samejima et al. .......... 56/320.1 |
| 2006/0201124 | A1 | | 9/2006 | Hall et al. |
| 2008/0236125 | A1 | * | 10/2008 | Sugio et al. ................... 56/14.7 |

* cited by examiner

*Primary Examiner*—Árpád Fábián-Kovács
(74) *Attorney, Agent, or Firm*—Crossley Patent Law; Mark A. Crossley

(57) ABSTRACT

The mower housing apparatus provides a three-blade design provides with all blades rotating in the same direction, either clockwise or counterclockwise, at the operator's discretion. The housing provides hydraulically operated housing doors, so that grass and debris can exit either side of the housing. Blade directional control and side exit choice allows an operator to travel immediately adjacent to any obstacle in either travel direction and continue to mow successfully. Consequently, an operator need not make loops and extra trips around and across a lawn in order to mow successfully. The housing apparatus also provides a hydraulic motor for quiet, efficient operation, with a minimum of 550 inch pounds of torque. Additionally, the apparatus includes a blade attachment that provides superior lift of grass and debris. A pair of each removable attachment is quickly attached to and detached from each blade.

2 Claims, 6 Drawing Sheets

BI-DIRECTIONAL MULTI-BLADE MOWER HOUSING APPARATUS

BACKGROUND OF THE INVENTION

A problem exists with mowers, and especially mowers using lateral grass exits and catchers, wherein the mower housing can only correctly function when traveling in one direction. For example, it is impossible to propel a mower directly adjacent to an obstacle if the mower outlet is on the side of the mower adjacent to the obstacle, such as a fence or wall for example. Even if a grass catcher is not installed, grass and other debris are prevented from proper mower housing exit by proximity to the obstacle. Simply providing an exit on each side of the mower housing is not usually a successful solution because proper grass and debris exit is also a function of blade rotational direction. In addition to this problem, there exist further issues with most mower housing and blade designs. One problem is mower noise. It has been established that hydraulic motors, for example, are quieter than are direct mechanical drives. An additional problem exists in the design of most blades in that insufficient lift of grass and debris is the norm.

One proposed solution has been to design multiple blade housings with counter-rotating blades, a feature that adds complexity and problems to blade drive designs. The present apparatus solves the above problems with a multi-blade housing having hydraulic drive, coincidentally rotating blades, and blades that provide lift of grass and debris. The apparatus further provides bi-directional blade travel choice, and housing doors on both sides of the housing.

FIELD OF THE INVENTION

The mower housing apparatus relates to lawn mower housings and more especially to a lawn mower housing with selective bi-directional, coincidentally rotated blades of superior lift design, and dual selective housing doors.

SUMMARY OF THE INVENTION

The general purpose of the mower housing apparatus, described subsequently in greater detail, is to provide a mower housing apparatus which has many novel features that result in an improved mower housing apparatus which is not anticipated, rendered obvious, suggested, or even implied by prior art, either alone or in combination thereof.

To attain this, the mower housing apparatus provides several unique features that provide for superior mowing capabilities, in either direction of travel. The three-blade design provides for all blades to rotate the same direction, either clockwise or counterclockwise, at the operator's discretion. The housing also provides hydraulically operated housing doors, so that grass and debris can exit either side of the housing. Blade directional control and side exit choice allows an operator to travel immediately adjacent to any obstacle in either travel direction and continue to mow and discharge effectively. Consequently, an operator need not make loops and extra trips around and across a lawn in order to mow successfully. The housing apparatus also provides a hydraulic motor for quiet, efficient operation. The motor provides a minimum of 550 inch pounds of torque.

Additionally, the current apparatus includes a blade attachment that provides superior lift of grass and debris. A pair of each removable attachment is quickly attached to and detached from each blade.

Thus has been broadly outlined the more important features of the improved mower housing apparatus so that the detailed description thereof that follows may be better understood and in order that the present contribution to the art may be better appreciated.

An object of the mower housing apparatus is to successfully mow in either direction of mower travel.

Another object of the mower housing apparatus is to successfully discharge mower debris from either housing side.

A further object of the mower housing apparatus is to provide coincidental multiple blade rotational direction.

An added object of the mower housing apparatus is to provide selective bi-directional blade travel.

And, an object of the mower housing apparatus is to provide blades with superior lift of mower debris.

These together with additional objects, features and advantages of the improved mower housing apparatus will be readily apparent to those of ordinary skill in the art upon reading the following detailed description of presently preferred, but nonetheless illustrative, embodiments of the improved mower housing apparatus when taken in conjunction with the accompanying drawings.

In this respect, before explaining the current embodiments of the improved mower housing apparatus in detail, it is to be understood that the mower housing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved mower housing apparatus. It is therefore important that the claims be regarded as including such equivalent constructions insofar as they do not depart from the spirit and scope of the mower housing apparatus. It is also to be understood that the phraseology and terminology employed herein are for purposes of description and should not be regarded as limiting.

DETAILED DESCRIPTION OF THE DRAWINGS

Figure 1:
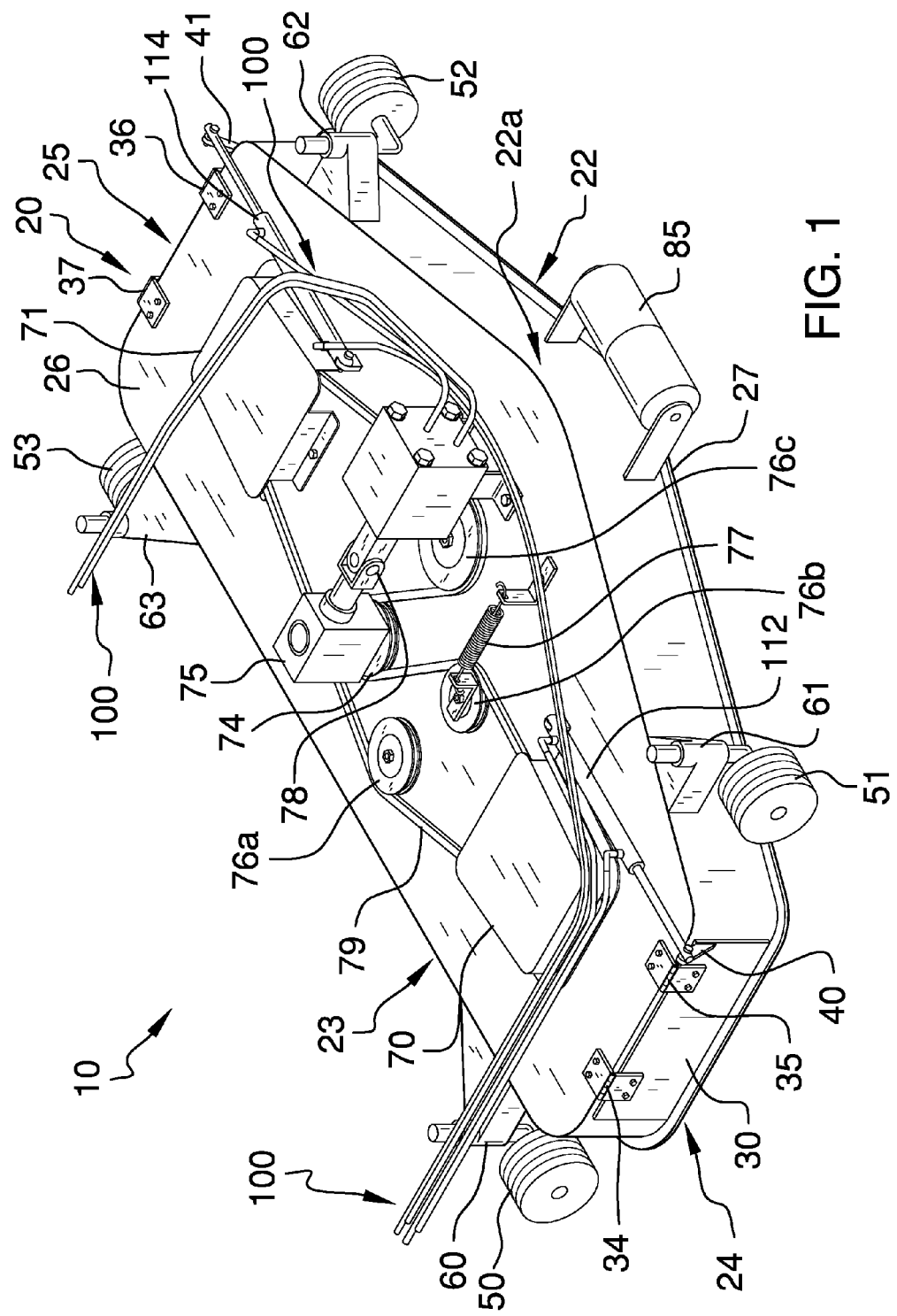
FIG. 1 is a top perspective view.

With reference now to the drawings, and in particular FIGS. 1 through 6 thereof, the principles and concepts of the mower housing apparatus generally designated by the reference number 10 will be described.

With respect to the above description then, it is to be realized that the optimum dimensional relationships for the parts of the mower housing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the mower housing apparatus.

Figure 2:
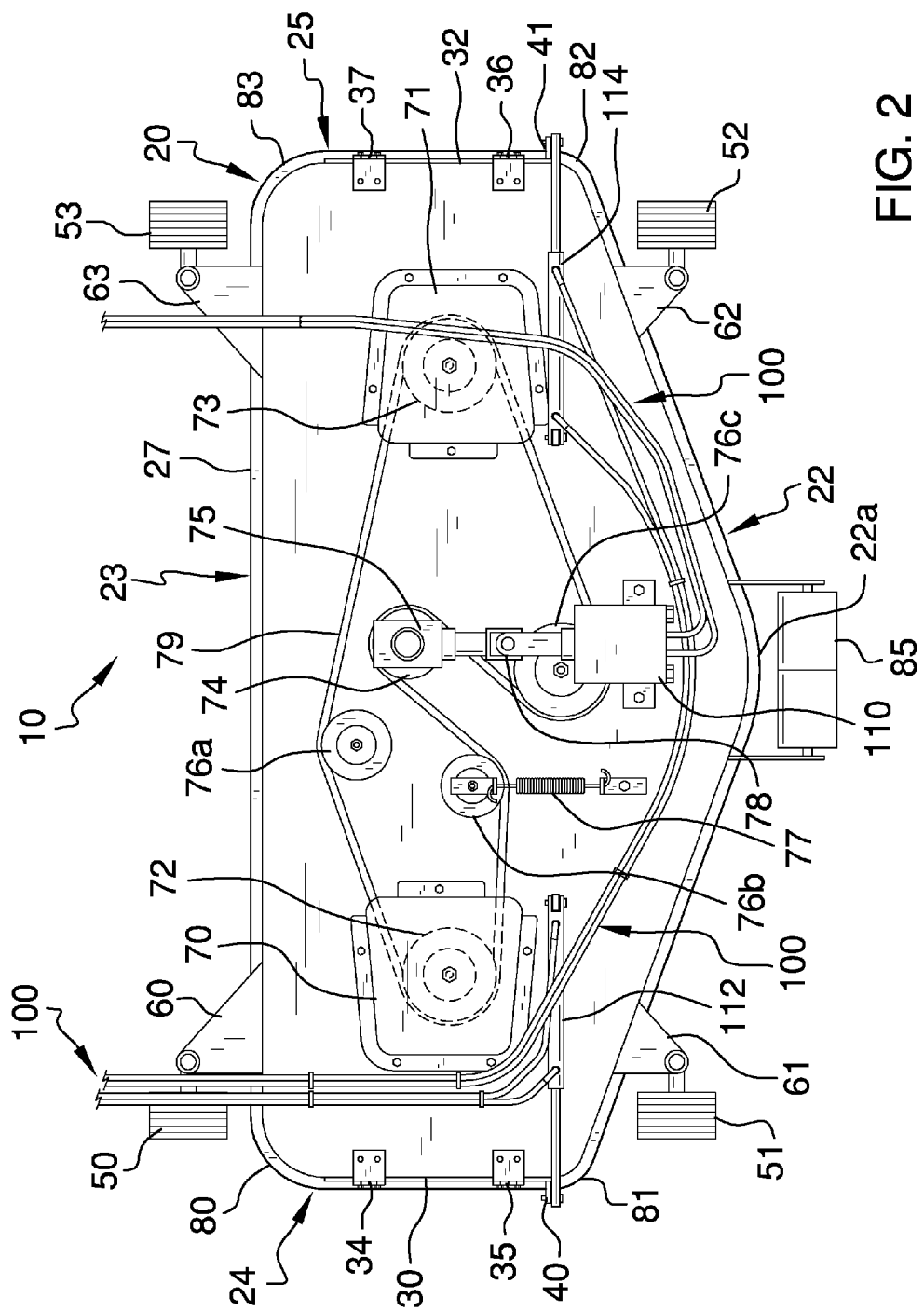
FIG. 2 is a top plan view.

Referring to FIGS. 1 and 2, the mower housing apparatus 10 partially comprises a pentagonal housing 20 that is attached to an existing mower. The housing 20 has a first side 24 spaced apart from a second side 25. The front 22 is spaced apart from the rear 23. The front 22 has a central rounded corner 22a. The first rounded corner 80 is disposed between the rear 23 and the first side 24. The second rounded corner 81 is disposed between the first side 24 and the front 22. The third rounded corner 82 is disposed between the front 22 and the second side 25. The fourth rounded corner 83 is disposed between the second side 25 and the rear 23. The rounded corners are important in correctly channeling grass and debris for best flow out of either the first door 30 or the second door 32 and also for preventing grass buildup within the housing 20. The top 26 is spaced apart from the open bottom 28. The lip 27 is disposed around the open bottom 28. The first door 38 is hingedly disposed in the housing 20 first side 24 via the first hinge 34 and the second hinge 35. The second door 32 is hingedly disposed in the housing 20 second side 25 via the third hinge 36 and the fourth hinge 37. All hinges are affixed to the housing 20 top 26.

Figure 4:
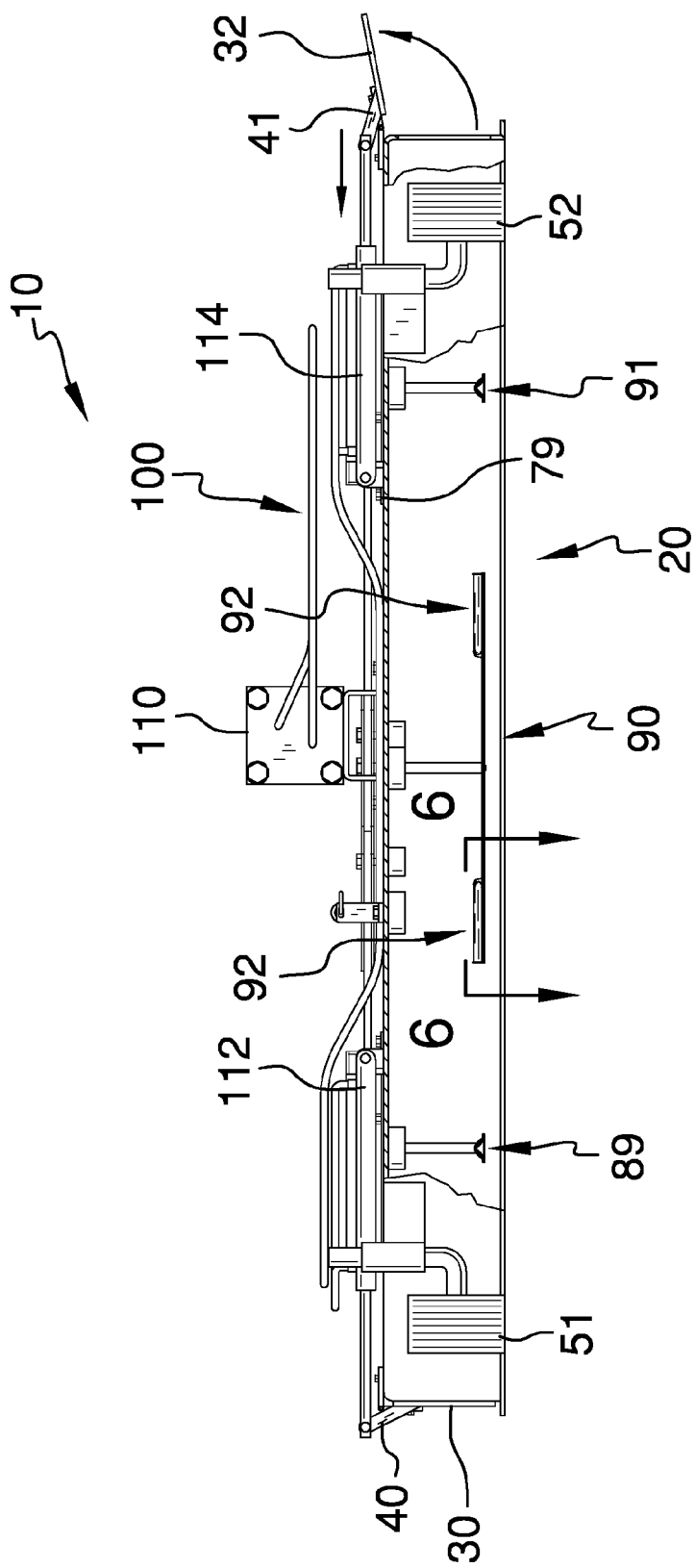
FIG. 4 is a front elevation partial cutaway view.
Figure 5:
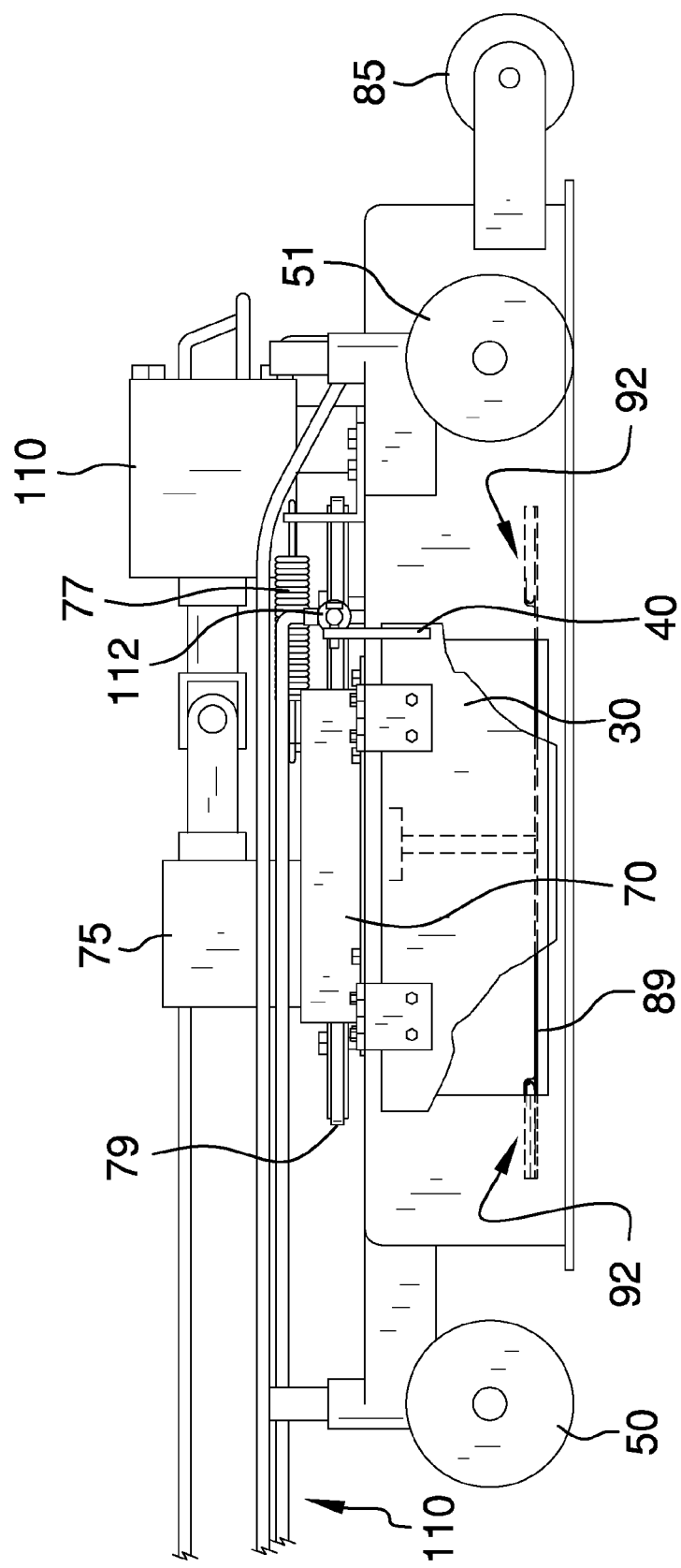
FIG. 5 is a first side lateral elevation partial cutaway view.

Continuing to refer to FIGS. 1 and 2 and referring also to FIGS. 4 and 5, the reversible hydraulic motor 110 is disposed on the housing 20 top 26. The motor 110 is proximal to the housing 20 front 22. The right angle drive 75 is disposed atop the housing 20. The right angle drive 75 is disposed rearwardly from the hydraulic motor 110. The u-jointed drive shaft 78 connects the hydraulic motor 110 to the right angle drive 75. The series of pulleys is rotationally disposed atop the housing 20. The pulleys comprise the drive pulley 74 powered by the right angle drive 75. The first idler pulley 76a is disposed proximal to and rearwardly from the drive pulley 74. The first lateral drive pulley 72 is disposed most proximal to the housing 20 first side 24. The second idler pulley 76b is disposed between the first lateral drive pulley 72 and the drive pulley 74. The second idler pulley 76b is spring tensioned by an extension spring 77. The front drive pulley 76c is disposed proximal to the hydraulic motor 110. The second lateral drive pulley 73 is disposed most proximal to the housing 20 second side 25. The drive belt 79 connects the pulleys such that the first lateral drive pulley 72, the front drive pulley 76c, and the second lateral drive pulley 73 rotate in the same direction. The extension spring 77 retains tension of the belt 79 between the pulleys.

Referring again to FIGS. 1, 2, and 5, the removable flanged first pulley housing 70 covers the first lateral drive pulley 72. The removable flanged second pulley housing 71 covers the second lateral drive pulley 73. The horizontally disposed front roller 85 is connected to the housing 20 front 22. The horizontally disposed hydraulic first cylinder 112 is in communication with the first door 30 via the first lever arm 40. The first cylinder 112 hydraulically and selectively opens and closes the first door 30. The horizontally disposed hydraulic second cylinder 114 is in communication with the second door 32 via the second lever arm 41. The second cylinder 114 hydraulically and selectively opens and closes the second door 32.

Referring again to FIGS. 1 and 2, the first wheel 50 is pivotally affixed to the housing 20 via the first pivot bracket 60. The first wheel 50 is proximal to the housing 20 first rounded corner 80.

The second wheel 51 is pivotally affixed to the housing 20 via the second pivot bracket 61. The second wheel 51 is proximal to the housing 20 second rounded corner 81. The third wheel 52 is pivotally affixed to the housing 20 via the third pivot bracket 62. The third wheel 52 is proximal to the housing 20 third rounded corner 82. The fourth wheel 53 is pivotally affixed to the housing 20 via the fourth pivot bracket 63. The fourth wheel 53 is proximal to the housing 20 fourth rounded corner 83. The plurality of hydraulic lines 100 supply the hydraulic motor 110, the first cylinder 112 and the second cylinder 114.

Figure 3:
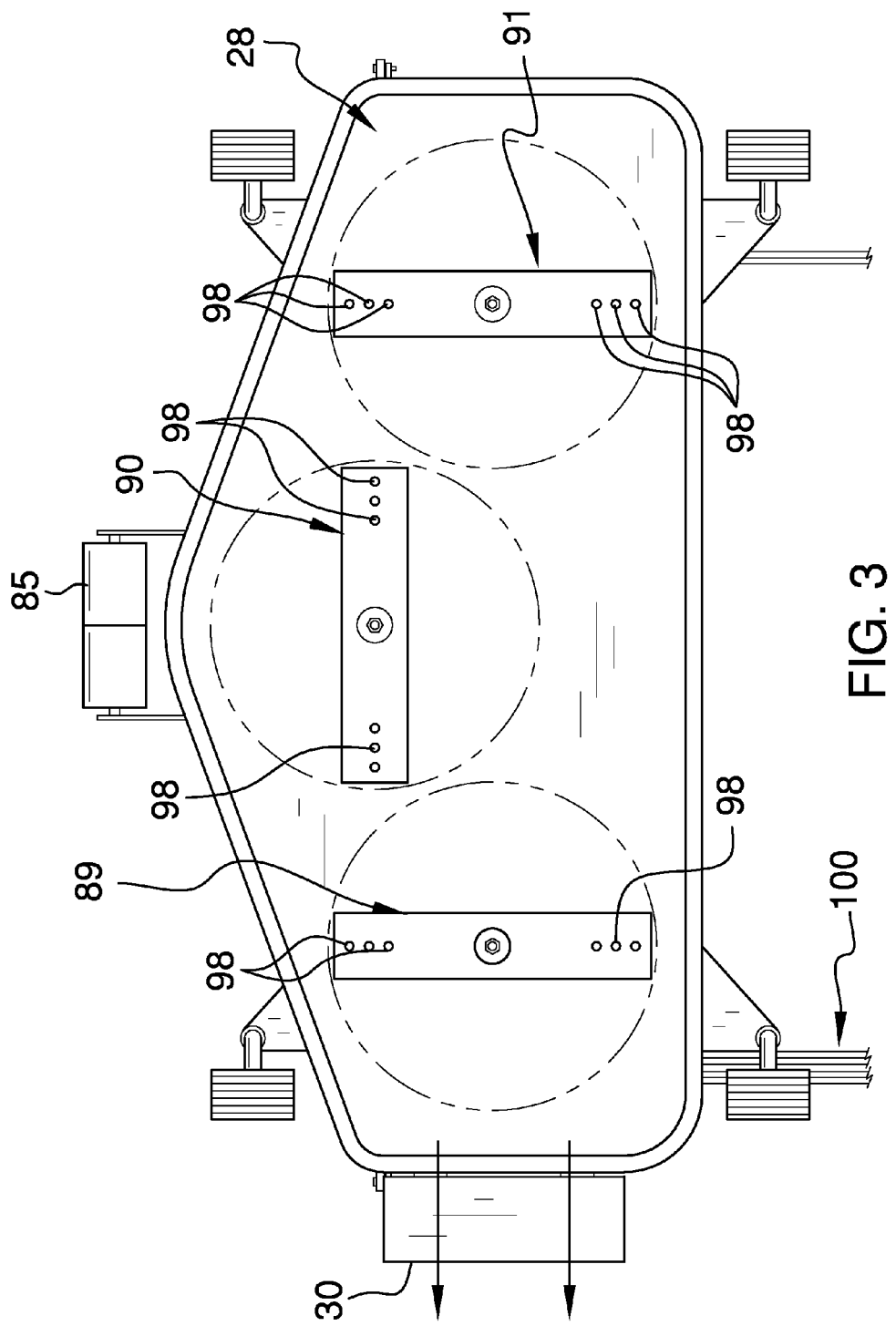
FIG. 3 is a bottom plan view.
Figure 6:
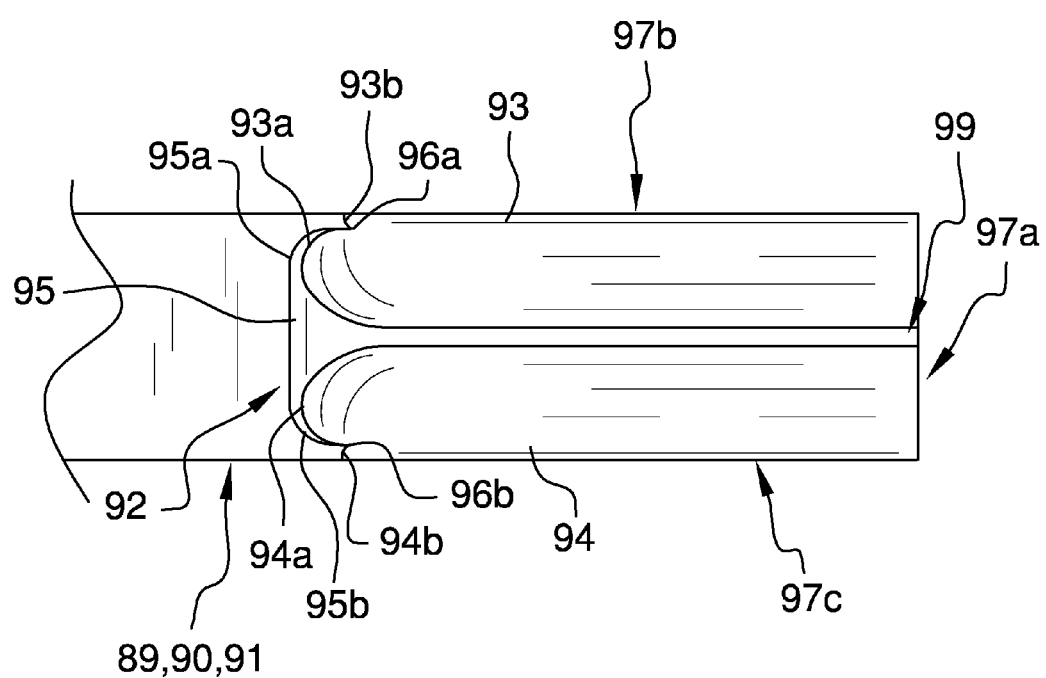
FIG. 6 is a partial top plan view of one end of a blade of FIG. 4, taken along the line 6-6.

Referring to FIGS. 3 and 6, the trio of mower blades disposed within the housing 20 comprises the first blade 89, the second blade 90, and the third blade 91. The first blade 89 is in communication with the first lateral drive pulley 72. The second blade 90 is in communication with the front drive pulley 76c. The third blade 91 is in communication with the second lateral drive pulley 73. Each blade comprises a pair of identical removable spaced apart blade attachments 92. Each attachment 92 and blade has a coincidental first outer edge 97b spaced apart from a coincidental second outer edge 97c and a coincidental outer end 97a. Each attachment 92 comprises a pair of risers comprising a first riser 93 spaced apart from a second riser 94. A gap 99 is disposed between a top of the risers. The first riser 93 has a first convex scallop 93a meeting a first V 96a. The first V 96a meets a first small outer scallop 93b. The second riser 94 is a mirror image of the first riser 93. The second riser 94 has a second convex scallop 94a meeting a second V 96b. The second V 96b meets a second small outer scallop 94b. A plate 95 is affixed below each pair of risers. Each plate 95 and riser pair form a triangle shape. Each plate 95 has a first rounded edge 95a slightly medially disposed from the first riser 93 first scallop 93a. Each plate 95 has a second rounded edge 95b slightly medially disposed from the second riser 94 second scallop 94a. Each blade plate 95 is affixed atop each blade via a plurality of fasteners 98.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the mower housing apparatus may be used.

Therefore, the foregoing is considered as illustrative only of the principles of the mower housing apparatus. Further, since numerous modifications and changes will readily occur to those skilled in the art, it is not desired to limit the mower housing apparatus to the exact construction and operation shown and described, and accordingly, all suitable modifications and equivalents may be resorted to, falling within the scope of the mower housing apparatus.

What is claimed is:

1. A mower housing apparatus, comprising, in combination:
    a pentagonal housing attached to an existing mower, the housing having a first side spaced apart from a second side, a front spaced apart from a rear, the front having a central rounded corner, a first rounded corner between the rear and the first side, a second rounded corner between the first side and the front, a third rounded corner between the front and the second side, a fourth rounded corner between the second side and the rear, a top spaced apart from an open bottom, a lip around the open bottom;
    a first door hingedly disposed in the housing first side;
    a second door hingedly disposed in the housing second side;
    a reversible hydraulic motor disposed on the housing top, the motor proximal to the housing front;
    a right angle drive disposed atop the housing, the right angle drive disposed rearwardly from the hydraulic motor;
    a u-jointed drive shaft connecting the hydraulic motor to the right angle drive;

a series of pulleys rotationally disposed atop the housing, the pulleys comprising:
  a drive pulley powered by the right angle drive;
  a first idler pulley disposed proximal to and rearwardly from the drive pulley;
  a first lateral drive pulley disposed most proximal to the housing first side;
  a second idler pulley disposed between the first lateral drive pulley and the drive pulley, the second idler pulley spring tensioned by an extension spring;
  a front drive pulley disposed proximal to the hydraulic motor;
  a second lateral drive pulley disposed most proximal to the housing second side;
  a drive belt connecting the pulleys such that the first lateral drive pulley, the front drive pulley, and the second lateral drive pulley rotate in the same selected direction;
a removable flanged first pulley housing covering the first lateral drive pulley;
a removable flanged second pulley housing covering the second lateral drive pulley;
a horizontally disposed front roller connected to the housing front;
a first horizontally disposed hydraulic cylinder in communication with the first door via a first lever arm, the first cylinder hydraulically and selectively opening and closing the first door;
a second horizontally disposed hydraulic cylinder in communication with the second door via a second lever arm, the second cylinder hydraulically and selectively opening and closing the second door;
a first wheel pivotally affixed to the housing via a first pivot bracket, the first wheel proximal to the housing first rounded corner;
a second wheel pivotally affixed to the housing via a second pivot bracket, the second wheel proximal to the housing second rounded corner;
a third wheel pivotally affixed to the housing via a third pivot bracket, the third wheel proximal to the housing third rounded corner;
a fourth wheel pivotally affixed to the housing via a fourth pivot bracket, the fourth wheel proximal to the housing fourth rounded corner;
a plurality of hydraulic lines supplying the hydraulic motor, the first cylinder and the second cylinder;
a trio of mower blades disposed within the housing, the blades selectively driven in a clockwise or counterclockwise rotation, the blades comprising a first blade, a second blade, and a third blade, the first blade in communication with the first lateral drive pulley, the second blade in communication with the front drive pulley, the third blade in communication with the second lateral drive pulley, each blade comprising a pair of identical removable spaced apart blade attachments, each blade attachment and blade having a coincidental first outer edge spaced apart from a coincidental second outer edge, a coincidental outer end, each attachment comprising:
  a pair of risers comprising a first riser spaced apart from a second riser, a gap between a top of the risers, the first riser having a first convex scallop meeting a first V, the first V meeting a first small outer scallop, the second riser a mirror image of the first riser, the second riser having a second scallop meeting a second V, the second V meeting a second small outer scallop;
  a plate affixed below each pair of risers, each plate and riser pair forming a triangle shape, each plate having a first rounded edge slightly medially disposed from the first riser first scallop, a second rounded edge slightly medially disposed from the second riser second scallop, each plate attached atop the blade.

2. The apparatus according to claim 1 wherein the hydraulic motor further comprises a torque of at least 550 inch pounds.

\* \* \* \* \*